United States Patent Office.

BENJAMIN ROBINSON, OF EAST GLOUCESTER, MASSACHUSETTS.

MEANS FOR OBTAINING GELATINE FROM THE HEADS OF FISHES.

SPECIFICATION forming part of Letters Patent No. 352,151, dated November 9, 1886.

Application filed June 6, 1884. Renewed April 24, 1886. Serial No. 200,083. (No specimens.)

*To all whom it may concern:*

Be it known that I, BENJAMIN ROBINSON, of East Gloucester, in the county of Essex, of the Commonwealth of Massachusetts, have invented a new and useful Improvement in Means for Obtaining Gelatine from the Heads of Cods and various other Fishes; and I do hereby declare the same to be described in the following specification.

My present invention specially relates to that for which the United States Letters Patent No. 78,016, dated May 19, 1868, were granted to me.

In carrying out my patented process the heads of the fishes, after having been placed into a vessel and the latter having been tightly closed, were subjected for about an hour to the action of steam, let directly into the vessel and upon the fish-heads, after which the steamed heads were compressed in a powerful press, whereby the gelatine was caused to exude from them through openings in the press-box. By this process the heads became permeated or impregnated with the water of condensation of the steam, which, becoming afterward expressed with the gelatine, had to be removed from it by evaporation at considerable expense.

In carrying out my present improved process I do not treat the fishes' heads by subjecting them to the action of steam thrown into direct contact with them in a digester or closed vessel; but I place them in a vessel provided with what is usually termed a "steam-jacket," and also with a cover. The steam-jacket is a chamber surrounding the outer surface, in whole or in part, of the vessel, and is to receive the steam, to cause it by its heat to properly act on the fish-heads. In this way the fish-heads, while inclosed in a vessel having its cover closed down, so as to prevent as much as possible any evaporation or loss of the normal moisture of the heads of the fish, are subjected to steam heat without having any condensation of the heating-steam directly upon them. After the fish-heads may have been so treated they are to be placed in a press-box and pressed, in order to force from them the gelatine, which subsequently is to be reduced by means of an evaporating-pan to a solid or thickened state, and is to have added to it during or prior to such reduction a small amount of crystallized carbolic acid—that is, say about one tea-spoonful of the acid to a gallon of the gelatine, and also a like quantity of some agreeable essence or essential oil—as that of checker-berry, for instance—for the purpose of overcoming the natural or any offensive odor of the gelatine.

By heating the fishes' heads, as described, in the digester, instead of by the steam forced into direct contact with them, their bones are readily reduced to a gelatinous or softened condition, and the gelatine can be removed from them to much better advantage and in greater quantity by the press than is the case when they are treated by steam in direct contact with them in the closed vessel.

The carbolic acid, besides answering as a preventive of the gelatine from putrefication, operates to decolorize it to a very considerable extent, and thereby renders it of much more commercial value.

My process differs very materially from that described in the United States Patent No. 243,713, in which the fish material containing the gelatine is exposed in a vessel to direct contact with steam, which permeates it and condenses in it, a process which, for reasons hereinbefore mentioned, is objectionable. In my process the steam by which the fish-heads are heated in no respect comes into contact with them, they being in a closed vessel, to the external surface of which the steam is applied, whereby any condensation of such steam within the fish-heads or the gelatine therein and the subsequent necessary removal of it therefrom are completely avoided.

I am aware that it is not new to mix with glue, white lead, chalk, and carbolic acid, or rosin, oil, and carbolic acid, and therefore I do not claim such. I use with the gelatine and carbolic acid an essence or essential oil, for the purpose of overcoming the disagreeable odors of both, and to produce an article of greater commercial value.

I therefore claim—

1. The improved process, substantially as described, for obtaining gelatine from the heads of fishes, it consisting in first subjecting them in a closed vessel or digester to the action of steam applied to the outer surface of such vessel, and subsequently expressing the gelatine from the heads and reducing it by evaporation of its normal moisture, in whole or in part, as set forth.

2. The new or improved article of manufacture, consisting of gelatine and an essence or essential oil, as described, and carbolic acid combined in or with the proportions, as set forth, while such gelatine is in a liquid state.

BENJAMIN ROBINSON.

Witnesses:
R. H. EDDY,
E. B. PRATT.